Jan. 17, 1956　　　W. BLOME　　　2,731,195
PUMPS FOR INFLATING INFLATABLE BODIES
Filed Nov. 17, 1952
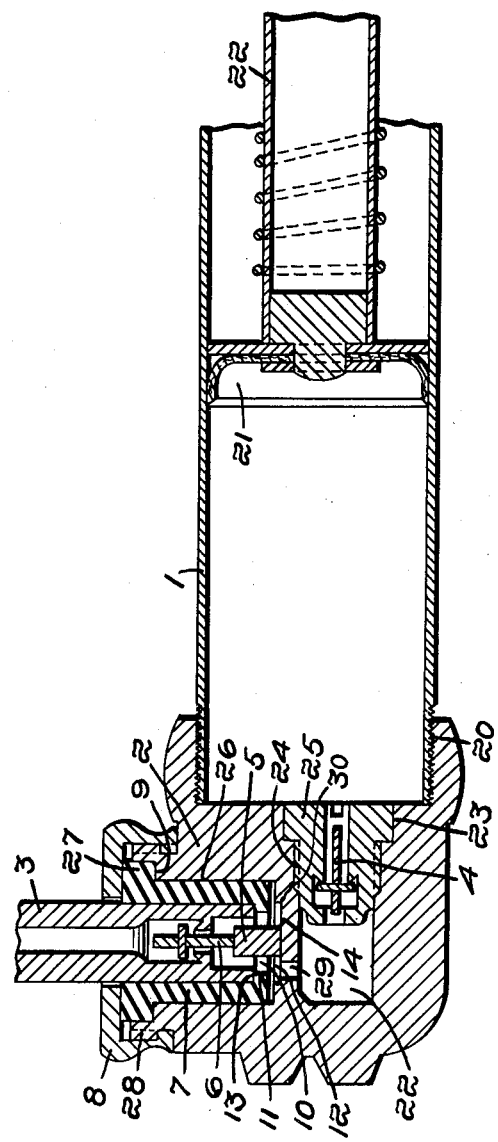
Inventor:
Wilhelm Blome,
by [signature] Attorney

2,731,195
PUMPS FOR INFLATING INFLATABLE BODIES

Wilhelm Blome, Sundern, Germany

Application November 17, 1952, Serial No. 320,965

Claims priority, application Germany July 28, 1952

4 Claims. (Cl. 230—172)

This invention relates to manually operated pumps and more particularly to pumps for inflating inflatable objects as, for instance, inner tubes or air chambers of tires of bicycles, motor cars and other vehicles.

One object of the invention is to provide an improved manually operated pump for compressing air, which pump does not require any hose connection between the air cylinder thereof and the tubular air admission valve forming an integral part of the inner tube or like object to be inflated.

Another object of the invention is to provide an improved pump of the aforementioned type having means for precluding, or minimizing, losses of compressed air in an air coupling situated between the cylinder of the pump and the valve of an inner tube to which the pump is attached and connected by said coupling.

Another object of the invention is to provide an improved pump of the aforementioned type comprising a novel arrangement of parts and novel sealing means to render it more compact and more efficient than the prior art pumps of this type.

Still another object of the invention is to provide an improved pump of the aforementioned type the cylinder of which comprises at the exhaust end thereof a nipple structure adapted to co-operatively engage, and be co-operatively engaged by, the tubular air admission valve of an inner tube and to effect an air-tight seal precluding, or minimizing, escape of compressed air between said nipple structure and said valve.

Further objects, advantages and features of the invention will become apparent as the following description of the invention proceeds and the features of novelty which characterize the invention will be pointed out with particularity in the claims annexed to and forming part of this specification.

For a better understanding of the invention reference may be had to the accompanying drawing which is a longitudinal section of a hand pump embodying the invention.

Referring now to the drawing, numeral 1 has been applied to the air cylinder of an air pump. Air piston 21 is movably arranged within cylinder 1. Piston 21 is attached to the piston rod 22 adapted to be manually operated by a handle (not shown). The left end of cylinder 1 is screw-threaded at 20 and supports the nipple body 2 which has an internal screw thread engaging the screw thread 20 on the left end of cylinder 1. The nipple body 2 defines an internal air chamber 22. Passage 23 in nipple body 2 is arranged parallel to the axis of cylinder 1. Passage 23 is screw-threaded at 24 and accommodates a check valve 25 having a movable valve element 4. Check valve 25 is provided with an external screw thread engaging the screw-threaded portion 24 of passage 23. Check valve 25 controls the flow of compressed air between cylinder 1 and air chamber 22, i. e. it permits compressed air to flow from the cylinder 1 into the air chamber 22 but precludes air from flowing from the air chamber 22 into the cylinder 1. A second passage or recess 26 in nipple body 2 is arranged at right angles to the first passage 23. A tubular valve 3 attached to the inner tube of a tire (not illustrated in the drawing) is shown to project into passage 26 of nipple body 2. Valve 3 is a check valve and is provided with a movable valve element 6 for controlling the admission of compressed air into the inner tube to which it is attached and of which it forms an integral part. The valve opening abutment 5 arranged in passage 26 of nipple body 2 is shown to be in co-operative engagement with valve element 6 of valve 3, thus causing opening of said valve 3. A substantially tubular sealing body 7 having an external diameter substantially equal to the internal diameter of passage 26 is arranged within passage 26. Sealing body 7 consists of an elastic material such as vulcanized rubber and has an axially outer flange 27 projecting radially outwardly from sealing body 7. The lower surface of flange 27 rests on a surface 9 of nipple body 2. Nipple body 2 is provided at 28 with a screw-threaded portion engaged by the screw thread of an internally screw-threaded cap 8. Flange 27 is compressed between the inner top surface of cap 8 and the surface 9 of nipple body 2. At the axially inner end thereof sealing body 7 is provided with a flange 11 projecting in radially inward direction. Flange 11 of sealing body 7 has an opening 10 of smaller diameter than the outer diameter of valve 3 and overlaps the lower end of valve 3. Thus flange 11 is adapted to effect an air tight seal of the narrow gap 13 formed between flange 11 and valve 3. The portion 14 of nipple body 2 situated below flange 11 of sealing body 7, i. e. the transverse partition formed by nipple body 2 terminating passage 26, is recessed at the side thereof adjacent sealing body 7 and defines a shoulder portion 30 of reduced diameter. The space 12 above portion or partition 14 of nipple body 2 is connected by a third passage 29 formed in and extending across partition 14 to the air chamber 22 in nipple body 2. Therefore the same pressure prevailing in air chamber 22 will also always prevail in space 12 and this pressure will cause an elastic deformation of sealing body 7 tending to provide a tight fit between sealing body 7 and the tubular valve 3 inserted into and engaged by the internal walls of sealing body 7. The pressure prevailing in the spaces 22 and 12 tends to compress the flange portion 11 of sealing body 7 and to press it firmly against the lower end of the valve 3 to preclude any escape of air from spaces 22 and 12 except through the valve 3 into the inflatable body to which valve 3 is attached and of which it forms an integral part.

It will be understood that, although but one embodiment of this invention has been shown and described in detail, the invention is not limited thereto. It will also be understood that the illustrated embodiment may be modified or other embodiments made without departing from the spirit and scope of the invention as set forth in the accompanying claims.

It is claimed:

1. In combination an air pump cylinder, a nipple body supported by one end of said cylinder and defining an internal air chamber, a check valve arranged within said nipple body to control the flow of compressed air between said cylinder and said chamber, a valve opening abutment within said nipple body, a tubular sealing body of an elastic material adapted for insertion of tubular valve stems arranged within a recess of said nipple body in co-axial relation to and spaced from said valve opening abutment, a passage formed in said nipple body connecting said chamber with the space of said recess situated immediately adjacent said chamber to cause the end of said sealing body adjacent said chamber to be acted upon in a direction longitudinally thereof by the pressure of air contained in said chamber to deform said sealing body by said pressure to provide a tight fit between said sealing body and any tubular valve inserted into said sealing body.

2. In combination an air pump cylinder, a nipple body supported by one end of said cylinder and defining an internal air chamber, a first passage in said nipple body parallel to the axis of said cylinder, a check valve arranged within said first passage to control the flow of compressed air between said cylinder and said chamber, a second passage in said nipple body at right angles to said first passage, a valve opening abutment in said second passage, a substantially tubular sealing body of an elastic material adapted for insertion of tubular valve stems and having an external diameter substantially equal to the internal diameter of said second passage arranged within said second passage, a first flange on said sealing body at the end remote from said chamber projecting radially outwardly from said sealing body, a second flange on said sealing body projecting radially inwardly from said sealing body, a screw threaded cap on said nipple body for compressing said first flange between said screw threaded cap and said nipple body, and passage means admitting air under pressure from said chamber to the surface of said second flange adjacent said chamber to expose said second flange to the pressure of the air contained in said chamber to compress said second flange in a direction longitudinally of said sealing body.

3. In combination an air pump cylinder, a nipple body supported by one end of said cylinder and defining an internal air chamber, a first passage in said nipple body parallel to the axis of said cylinder, a check valve arranged within said first passage to control the flow of compressed air between said cylinder and said air chamber, a second passage in said nipple body at right angles to said first passage, the end of said second passage adjacent said first passage having a reduced diameter, a substantially tubular elastic sealing body adapted for insertion of tubular valve stems and having an external diameter substantially equal to the internal diameter of said second passage arranged within said second passage, a first flange on said sealing body having at the end thereof remote from said chamber projecting radially outwardly from said sealing body, a second flange on said sealing body at the end thereof adjacent said chamber projecting radially inwardly from said sealing body, a screw threaded cap on said nipple body for compressing said first flange between said screw threaded cap and said nipple body, an abutment on said nipple body arranged in coaxial relation with respect to and projecting into said sealing body, and a third passage in said nipple body interconnecting said chamber and the end of said second passage of reduced diameter.

4. In combination an air pump cylinder, a body defining an air chamber supported by said cylinder on one end thereof, a check valve arranged between said cylinder and said chamber, a valve opening abutment arranged within said body at right angles to the axis of said cylinder, a sealing body of an elastic material having a tubular portion adapted for insertion of tubular valves arranged within a recess of said body in coaxial relation with respect to and spaced from said valve opening abutment, a flange on said sealing body on the end thereof adjacent said chamber extending radially inwardly from said tubular portion of said sealing body, and passage means within said body permitting air under pressure within said chamber to compress said flange on said sealing body in a direction longitudinally of said tubular portion of said sealing body.

References Cited in the file of this patent

UNITED STATES PATENTS

| 1,222,030 | Raymond | Apr. 10, 1917 |
| 1,524,683 | Bertelsmann | Feb. 3, 1925 |

FOREIGN PATENTS

| 20,977 | Great Britain | Jan. 30, 1907 |